United States Patent
Park

[11] Patent Number: 5,965,950
[45] Date of Patent: Oct. 12, 1999

[54] DEVICE FOR CONTROLLING THE INJECTION LOCATION OF WASHER SOLUTION

[75] Inventor: In Heum Park, Kyungki-do, Rep. of Korea

[73] Assignee: Hyundai Motor Company, Seoul, Rep. of Korea

[21] Appl. No.: 08/988,408

[22] Filed: Dec. 10, 1997

[30] Foreign Application Priority Data

Dec. 12, 1996 [KR] Rep. of Korea ............... 96-64893

[51] Int. Cl.⁶ ............................................. B60S 1/06
[52] U.S. Cl. .................. 307/10.1; 15/250.01; 137/82; 239/104; 239/284.1; 318/DIG. 2
[58] Field of Search ............................. 307/9.1, 10.1; 239/284.1, 104; 15/250.001, 250.01; 137/82; 318/DIG. 2; 361/236, 239; 417/44.2

[56] References Cited

U.S. PATENT DOCUMENTS

| | | | |
|---|---|---|---|
| 4,318,510 | 3/1982 | Koike | 239/284 A |
| 4,618,096 | 10/1986 | Kondo et al. | 239/101 |
| 4,720,664 | 1/1988 | Iwamoto et al. | 318/444 |
| 4,768,716 | 9/1988 | Buchanan et al. | 239/101 |
| 5,071,315 | 12/1991 | Kiyama et al. | 415/152.1 |
| 5,080,554 | 1/1992 | Kamimura | 415/55.6 |
| 5,166,587 | 11/1992 | Smart | 318/DIG. 2 |
| 5,283,926 | 2/1994 | Hoshino | 15/250.04 |
| 5,809,609 | 9/1998 | Shin | 318/DIG. 2 |
| 5,820,026 | 10/1998 | Raghu | 15/250.01 |
| 5,822,827 | 10/1998 | Dimatteo et al. | 15/250.03 |

*Primary Examiner*—Albert W. Paladini
*Attorney, Agent, or Firm*—Birch, Stewart, Kolasch & Birch, LLP.

[57] ABSTRACT

A washer solution hose controlling device includes a car speed sensor and an electronic control device outputting a control signal in proportion to the car speed detected from the car speed sensor. The washer solution hose controlling device further employs a solenoid where the voltage supplied from the battery, depending upon the control signal output of the electronic control device which is in proportion to the car speed, is varied. Both sides of a feed hose are pushed by the solenoid to increase the injection pressure of washer solution proportionate to the detected car speed.

6 Claims, 2 Drawing Sheets

DEVICE FOR CONTROLLING THE INJECTION LOCATION OF WASHER SOLUTION

FIELD OF THE INVENTION

This invention relates to a device for controlling the injection location of a washer solution and more particularly, to a device for controlling the washer solution hose so as to fix the washer solution injection location even in the midst of high-speed driving. The injection location is adjusted by a solenoid which reduces a cross-sectional area of the feed hose by pressing one side of the feed hose.

BACKGROUND OF THE INVENTION

In general, washer solution in a car is used for washing a front glass window via operation of a washer switch. When the switch is activated the washer solution is supplied via its feed hose from a washer solution tank installed within a car to a nozzle at the surface of car body.

However, the conventional window washer has recognized some disadvantages in that under the pressure of outer air blowing against a car during high-speed driving, injected washer solution is located at 100~150 mm lower than low-speed driving. This lower displacement of the solution may contribute to reduced cleaning effects during the rotation of wiper blades.

SUMMARY OF THE INVENTION

The present invention is intended to overcome the prior art problems.

It is therefore an object of the invention to provide a device for controlling the injection location of a washer solution in such a manner that the washer solution is injected to the fixed location during high-speed driving.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF REFERENCE NUMBERS RELATED TO MAJOR PARTS OF THE DRAWING

10: Electronic Control
11: Solenoid
11a: Press ram
12: Feed Hose
13: Pump
14: Washer Solution Tank
15: Nozzle
16: Car Glass
17: Car Body
S1: Car Speed Sensor
SW1: Operating Switch
R1: Variable Resistance

DETAILED DESCRIPTION OF PREFERRED EMBODIMENTS

To achieve the object as aforementioned, this invention relates to a washer solution hose controlling device that includes a washer solution tank containing a washer solution. The tank is provided within a car body. The invention includes a hose connected from a washer solution tank to a washer solution injection nozzle provided at the surface of car body. The washer solution hose controlling device further includes a pump designed to supply the washer solution to a car glass window. The invention utilizes a car speed sensor and an electronic control device for outputting a control signal in proportion to the car speed detected from the car speed sensor. The invention employs a solenoid where the voltage supplied from a battery is varied depending upon the control signal output of the electronic control device which is in proportion to the car speed. Both sides of the feed hose are pushed by the solenoid to increase the injection pressure of washer solution proportionate to the detected car speed.

This invention is explained in more detail as set froth hereunder by way of the accompanied drawings.

Figure 1:
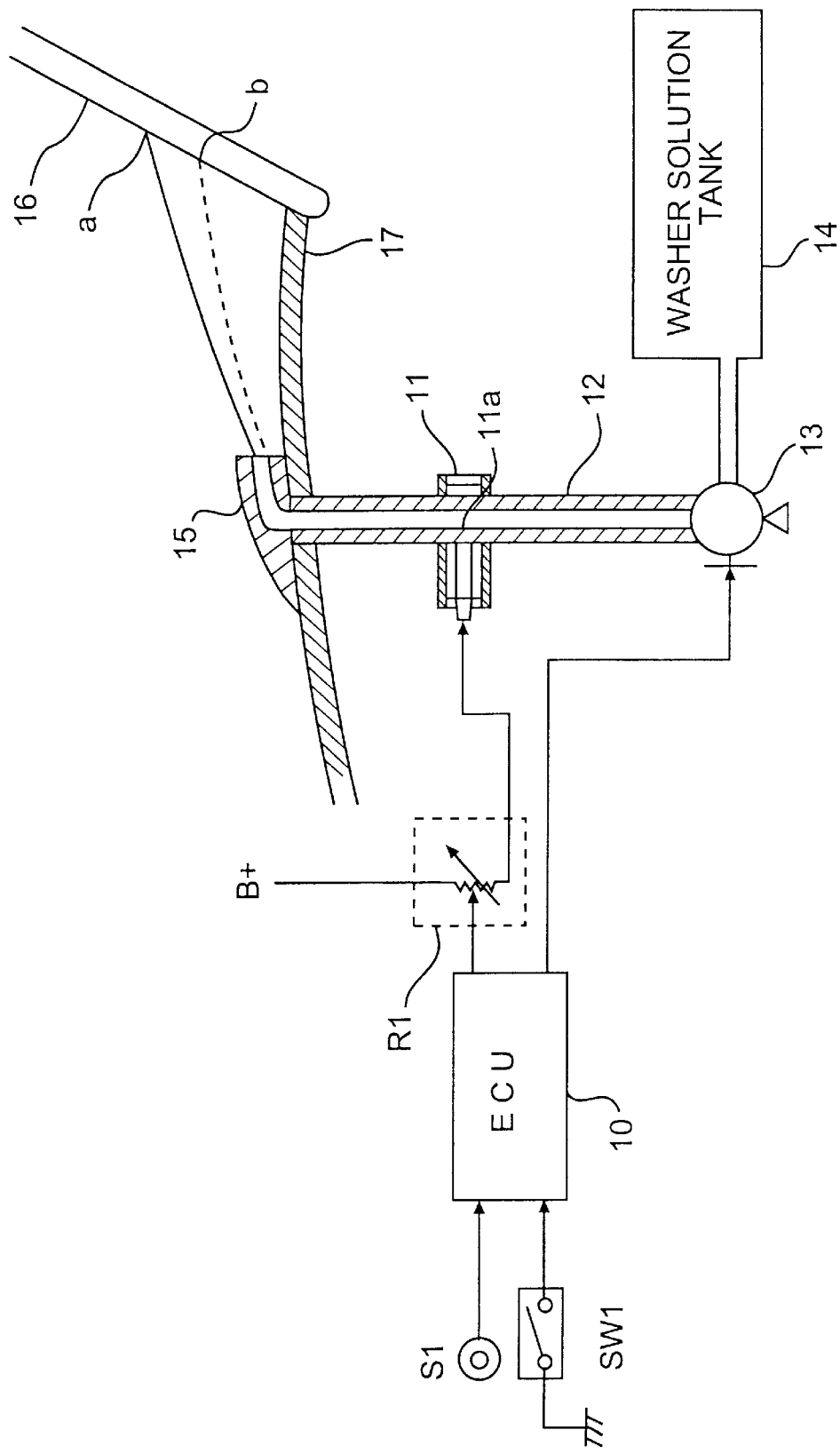
FIG. 1 is a diagram showing a device structure for controlling the washer solution according to this invention.

FIG. 1 is a diagram showing a device structure for controlling the washer solution according to this invention.

Referring to FIG. 1, there is provided a car speed sensor S1. Sensor S1 detects the driving speed and is connected to the input of an electronic control device 10. An operating on/off switch SW1 is operatively linked to the electronic control device 10.

The electronic control device 10 outputs a control signal in proportion to the detected car speed generated by the speed sensor S1. A variable resistance R1 has a resistance value that is varied depending upon the control signal of the electronic control device 10. This varied resistance changes the voltage supplied to a solenoid 11 from a battery power source B+.

A washer solution tank 14 within a car body 17 stores and supplies the washer solution. A pump 13 provides pressure to move the washer solution to the car glass surface 16 via a nozzle 15 at the surface of car body 17.

The solenoid 11, installed at both sides of the feed hose 12, is supplied with the battery power source B+ whose voltage is varied according to the variable resistance R1 value. By pressing the feed hose 12 in a horizontal direction, the solenoid increases the supply pressure of the injected washer solution toward the car glass 16.

Therefore, when the washer solution is injected during a high-speed driving, its injection pressure also becomes high.

Figure 2:
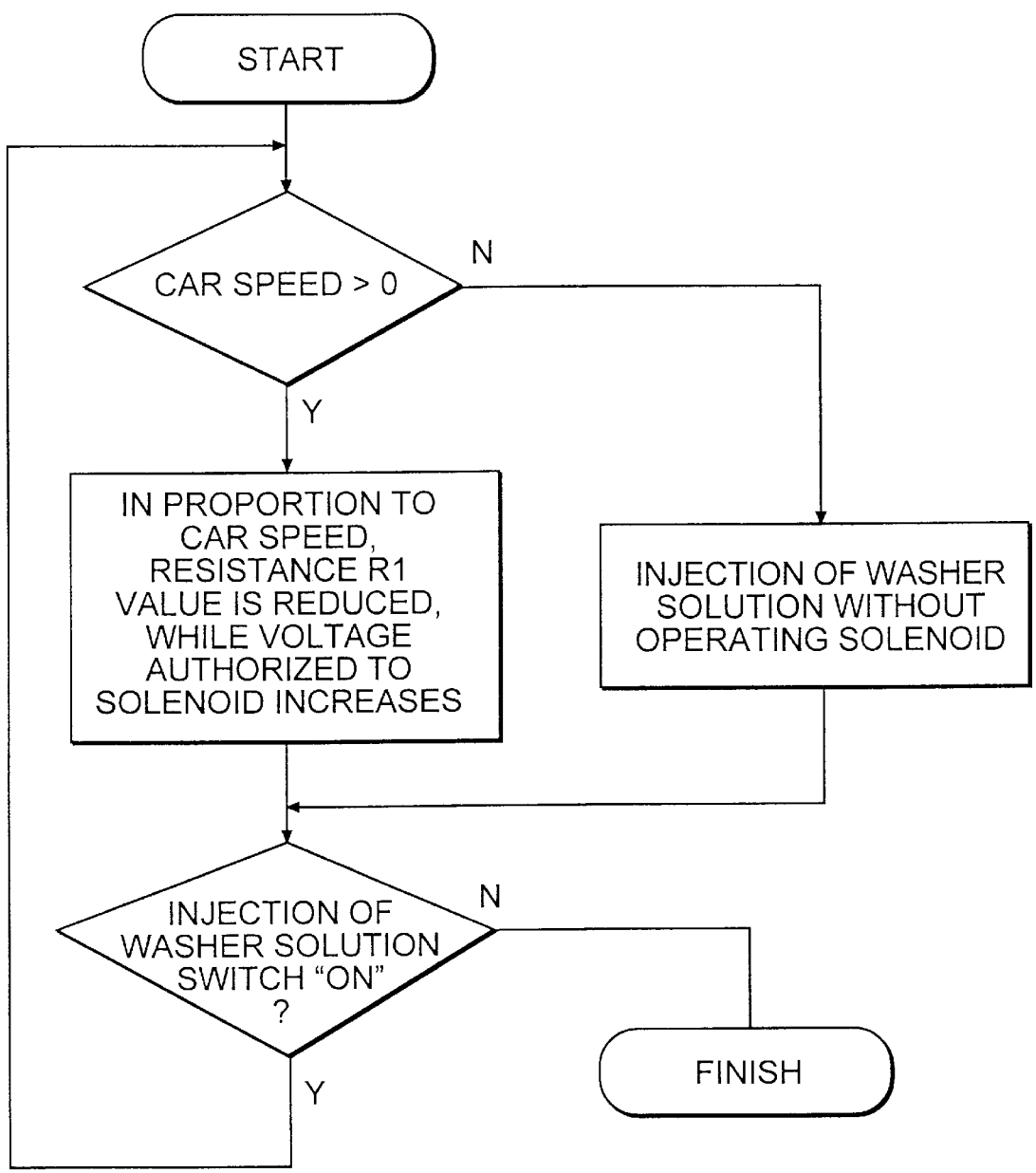
FIG. 2 is a flowchart showing the operating program of an electronic control device illustrated in FIG. 1.

Referring to FIG. 2, an operating program flowsheet of the electronic control device 10 is illustrated. The program is operated in such a manner that the first step is to detect the car-driving condition through a car-speed sensor S1. The second step includes operating solenoid 11 which receives small and large resistance values, respectively, during high- and low-speed driving, based on the variable resistance R1. Under the non-driving condition, the washer solution is simply injected through the nozzle while the solenoid 11 does not work. When the car is stopped, a weak pressure of outer air blowing against a vehicle does not influence the injection location of the washer solution.

The washer solution hose controlling device according to this invention has an advantage in that even during a high-speed driving, the injection location of the washer solution may be controlled in a fixed level, thus contributing much to safer driving conditions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A washer system comprising:
   a tank filled with a first fluid;
   a hose having a cross-sectional area, said hose being connected to said tank;
   a nozzle connected to said hose;
   a pump operatively linked to said hose and said tank, said pump moving the first fluid through said hose and said nozzle;
   a switch;
   means for reducing said cross-sectional area of said hose;
   a sensor generating a value based on translational movement of the washer system relative to a terrain; and
   an electronic control unit operatively linked to said switch, said pump, said reducing means, and said sensor; upon activation of said switch, said electronic control unit provides a control signal to said reducing means which is proportional to said value of said sensor, whereby said reducing means changes said cross-sectional area of said hose and the first fluid ejected from and outside said nozzle maintains a predetermined direction irrespective of contact with a second fluid disposed outside said nozzle.

2. The washer system of claim 1, wherein said reducing means includes a solenoid.

3. The washer system of claim 1, further comprising a variable resistor operatively linked to said electronic control unit, said reducing means further includes a solenoid operatively linked to said variable resistor.

4. The washer system of claim 1, further comprising a resistor and a battery, said battery being operatively linked to said resistor and said solenoid.

5. The washer system of claim 1, wherein said sensor is a speed sensor and said reducing means reduces said cross-sectional area of said hose proportional to an increase in speed detected by said speed sensor.

6. The washer system of claim 1, further comprising a windshield.

* * * * *